United States Patent
Frank et al.

(10) Patent No.: US 12,435,970 B2
(45) Date of Patent: Oct. 7, 2025

(54) IN-PROCESS DIAMETER MEASUREMENT GAGE

(71) Applicant: Gagemaker, LP, Pasadena, TX (US)

(72) Inventors: Jimmy I. Frank, San Antonio, TX (US); John Wolfe, III, Pearland, TX (US); Craig Cloud, New Braunfels, TX (US); Mark Bewley, Lakehills, TX (US); Kris Dawson, Pearland, TX (US)

(73) Assignee: Gagemaker, L.P., Pasadena, TX (US)

( * ) Notice: Subject to any disclaimer, the term of this patent is extended or adjusted under 35 U.S.C. 154(b) by 0 days.

(21) Appl. No.: 18/450,369

(22) Filed: Aug. 15, 2023

(65) Prior Publication Data

US 2024/0125590 A1  Apr. 18, 2024

Related U.S. Application Data

(63) Continuation of application No. 17/401,287, filed on Aug. 12, 2021, now Pat. No. 11,725,931, which is a continuation of application No. 16/379,568, filed on Apr. 9, 2019, now abandoned, which is a continuation of application No. 15/611,745, filed on Jun. 1, 2017, now Pat. No. 10,254,099.

(60) Provisional application No. 62/344,369, filed on Jun. 1, 2016.

(51) Int. Cl.
*G01B 5/10* (2006.01)
*G01B 11/10* (2006.01)

(52) U.S. Cl.
CPC .................. *G01B 11/105* (2013.01)

(58) Field of Classification Search
CPC ....................................................... G01B 5/10
USPC ....... 33/701, 710, 711, 772, 773, 780, 555.1
See application file for complete search history.

(56) References Cited

U.S. PATENT DOCUMENTS

| | | | | |
|---|---|---|---|---|
| 4,524,524 A * | 6/1985 | Frank | ....................... | G01B 5/08 33/199 R |
| 4,700,484 A * | 10/1987 | Frank | ..................... | G01B 11/08 33/780 |
| 5,761,821 A * | 6/1998 | Laycock | ................ | B23Q 17/20 33/550 |
| 7,197,837 B1 * | 4/2007 | Blanford | ................ | G01B 5/003 33/555.1 |
| 7,228,640 B2 * | 6/2007 | Trionfetti | ................ | B24B 49/04 33/555.1 |
| 11,022,419 B2 * | 6/2021 | Douglas | ................. | G01B 3/205 |
| 11,725,931 B2 * | 8/2023 | Frank | ................... | G01B 11/105 33/701 |
| 2002/0050069 A1 * | 5/2002 | Mellander | .............. | G01B 5/201 33/555.1 |
| 2006/0042109 A1 * | 3/2006 | Kanai | ...................... | G01B 5/08 33/555.1 |
| 2012/0246956 A1 * | 10/2012 | Andersson | ............. | G01B 5/252 33/555.1 |
| 2013/0255092 A1 * | 10/2013 | Trionfetti | ............. | B24B 49/045 33/555.1 |

(Continued)

*Primary Examiner* — George B Bennett
(74) *Attorney, Agent, or Firm* — McAughan Deaver PLLC (57) ABSTRACT

An In-Process Diameter Gage comprises a Position Detection Subsystem, preferably an optical switch and trigger, a Dimension Measurement Subsystem, preferably comprising a wheel of known diameter and a rotation encoder, and a Data Processing Subsystem, all configured and arranged to determine a dimensional property of a rotating part, such as diameter.

20 Claims, 3 Drawing Sheets

(56) References Cited

U.S. PATENT DOCUMENTS

2015/0082651 A1* 3/2015 Yeh .................. G01B 5/201
  33/831
2016/0178341 A1* 6/2016 Hieb .................. G01B 5/30
  33/555.1

* cited by examiner

IN-PROCESS DIAMETER MEASUREMENT GAGE

CROSS REFERENCE TO RELATED APPLICATIONS

This application claims benefit of and priority to U.S. Provisional Application Ser. No. 62/344,369, filed on Jun. 1, 2016, the entire contents of which are incorporated herein for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to metrological devices and processes; and more specifically related to an in-process diameter measurement gage and methods.

DESCRIPTION OF THE RELATED ART

U.S. Pat. No. 4,700,484, owned by Applicant, states "An apparatus for measuring the diameter of an object is disclosed. A rotatable wheel of known diameter capable of movement in three axes is contacted with an object capable of rotation. The wheel is attached to a shaft encoder, which produces pulses as the wheel rotates. As the object is rotated, start and end reference marks are sensed and the pulses produced by the shaft encoder are counted. A microprocessor calculates the diameter of the object knowing the wheel diameter and counts per revolution and the counts per revolution of the object. The apparatus can be adapted to measure the internal or external diameter of smooth objects or the internal or external pitch diameter of threaded objects. The apparatus can also use a calibrated object to measure the diameter of a wheel of unknown diameter to allow the wheel to be used in later measurements."

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are presented not to limit the scope of what Applicants have invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating some or all aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's is efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

We have invented a system configured to determine or measure one or more dimensional properties of a manufactured item or part, preferably, but not exclusively during the manufacturing phase. For example and without limitation, the system can be used to determine or measure, among other parameters, inside or outside diameter, thread profile parameters, such as minor diameter, pitch diameter, major diameter, pitch, flank angle, and thread length. For purposes of this disclosure, the item being measured will be referred to as the "part." In a is preferred implementation of this invention, one or more dimensional properties of the part, such as a threaded pipe, is measured while the part is rotating, such as during manufacture. For example, measurements may be taken while the part is rotating at speeds typically associated with machining or grinding operations. More specifically, measurement may be taken at rotational speeds up to about 400 SFM and higher. Accuracies and repeatability down to at least about 0.0002" (0.2 mils) are achievable and the diameter that the system can determine is effectively unlimited. The system eliminates the need for inaccurate pi ($\pi$) tapes or custom-built micrometers, which can require two or even three people to make accurate measurements. For example, when the invention is implemented with a CNC manufacturing device, the invention may be called for by the CNC program from the tool holder and implemented to make measurements at the proper time and location. Alternately, the invention may be implemented automatically and continuously during manufacture or may be implement manually as desired. Further, the dimensional information generated by the invention may be integrated into the CNC program. For purposes of this disclosure, a lathe will be used as the manufacturing device and the manufactured part will be a threaded pipe. It will be understood that the invention is not limited to this specific manufacturing device or this specific manufactured part.

Our system comprises three main subsystems: a Position Detection Subsystem, a Dimension Measurement Subsystem and a Data Processing subsystem. The Position Detection Subsystem is configured to detect and indicate a specific rotational position of the part during the measurement process. By specific rotational position, it is meant at least a time-referenced location or event, and not necessarily a coordinate location in space, although the latter is within the scope of the present invention. A Position Detection Subsystem preferably comprises an optical switch or detector in which, for example, a trigger, such as a reflector, is attached to a rotating component of the lathe whose rotation is representative, directly or indirectly, of the rotation (e.g., revolutions per minute) of the part. In one implementation, the optical detector is a light switch and reflector combination, the output of which is, for example, a voltage pulse every time the reflector passes through the light beam. The OPB740 optical detector available is from Optek Technology has been found suitable for this purpose, and the specifications and operational characteristics of that device are incorporated herein by reference.

It should be appreciated that the Position Detection Subsystem does not have to detect the absolute (angular) positon of the pipe relative to the lathe or other, or other reference point, but rather only a repeatable, relative position, such as the rotating reflector passing through the fixed light beam. While it is presently preferred that the Position Detection Subsystem indicate simply a completed revolution of the part, it may be desirable in some embodiments of the invention for the Position Detection Subsystem to detect the absolute position of the part in space. For example, triggers (e.g., reflectors) could be located 90° apart, and a datum of the part to be measure can be oriented in the lathe relative to one or more of these triggers.

Preferably, the Position Detection Subsystem is mounted in an out-of-the way, or remote, or protected, or sealed location on the lathe so that the subsystem is not damaged or fouled during machining operations. Because of the dedicated mounting location, it is desired, but not required, that the Position Detection Subsystem be hard wired for power. Alternately, the Position Detection Subsystem can be battery powered. It is preferred, but not required, that the Position Detection Subsystem report a condition of the power source through the communication component.

The Position Detection Subsystem also may comprise a wired and/or wireless communication component, such as a radio frequency transmitter, configured to transmit a signal representative of the pipe position, including, but not limited to, an analog signal, such as a voltage pulse or digital data, or both. It will be appreciated that this communication component may be a one-way communication pathway from the Position Detection Subsystem to the Dimension Measurement Subsystem and/or to the Data Processing Subsystem. In other words, in certain embodiments, it may not be necessary for the Dimension Measurement Subsystem or the Data Processing Subsystem to send data or information to the Position Detection Subsystem.

In a preferred embodiment, the Position Detection Subsystem may comprise a one-way wireless communication pathway with the Dimension Measurement Subsystem. In this embodiment, the communication pathway is desired to be as instantaneous as possible and with repeatable or consistent latency. Inconsistency or variability in latency or a varying delay of this signal transmission will adversely affect the accuracy of the dimensional measurements because the relationship between the completion of a part revolution and part measurements will vary along with the varying latency. One form of acceptable wireless communication protocol with repeatable, consistent latency is a simple analog radio signal. For example, the Texas Instrument chip model no. CC1101 is suitable for this one-way analog communication link, and the specifications and operational characteristics are incorporated herein by reference.

Alternately, a wireless digital communication protocol may be used if the latency, and variability of the latency does not adversely affect the accuracy and/or precision of the ultimate measurement. For example, if the embodiment under consideration merely requires an indication that a part revolution has been completed, a wireless digital communication protocol in which the same predetermined digital "word" is sent every time to indicate that a part revolution has been completed, the latency and variability of the latency, if any, in such communications likely will be acceptable for purposes of this invention. Still further, there are known methodologies for dealing with varying communication latencies, such as transmitting time stamps with the data, and/or other information that allows a processor, such as the Dimension Measurement Subsystem or the Data Processing Subsystem, to correct for the varying latency. All of these communication protocols and others known, but not discussed herein, may be used with various embodiments of the inventions disclosed herein.

The Dimension Measurement Subsystem, sometimes referred to as a gage head, may comprise a one or more transducers configured to measure or determine a physical attribute, property or parameter of the part. The Dimension Measurement Subsystem may be mounted to or adjacent the lathe, so that it can be manually or automatically moved into measurement positon, as desired. As mentioned above, the Dimension Measurement Subsystem also can be is implemented as a machine tool retrievable by the tool arm, as desired. It is preferred, but not required, that the Dimension Measurement Subsystem be battery powered and comprise a first communication component configured to receive a wired or wireless communication from the Position Detection Subsystems. For example, the first communication component may comprise a radio frequency receiver configured to receive the radio frequency signal transmitted by the Position Detection Subsystem.

To measure or determine, for example, the diameter of the part (e.g., pipe) or of an area on the part, the Dimension Measurement Subsystem may be configured as a perimeter transducer comprising a contact wheel of known diameter coupled to a rotation encoder. For example and not limitation, a rotation encoder manufactured by BEI Sensor, model H25, having a resolution of about 12,500 increments per revolution, and even up to about 50,000 increments per revolution, has been found suitable for determining diameters with this invention, and the specifications and operational characteristics of that device are incorporated herein by reference.

While absolute rotation encoders may be utilized, incremental rotation encoders are sufficient for purposes of this invention. The contact wheel makes contact with the part at the location to be measured and the wheel is biased against the pipe with a predetermined force sufficient to maintain measurement contact between the wheel and the pipe, preferably without causing appreciable elastic or plastic deformation. The contact wheel may be made from the same material as the part, but preferably, the wheel is made from hardened steel. For example, an aluminum contact wheel may be used for an aluminum pipe. However, a preferred embodiment contemplates a hardened steel contact wheel (e.g., HRC of about 65) for all parts. In such circumstances, any differences in material properties between the wheel and part (such as, modulus of elasticity) may be accounted for as described herein. The contact wheel should be aligned with the part to minimize skipping, skidding, sliding, or other measurement contact errors. Further, it is preferred, but not required that the contact portion of the contact wheel have a transverse radius equal to the radius of the wheel. Such structural arrangement minimizes the measurement error that can be caused by misaligned (e.g., out of normal) contact wheel to the is pipe. Alternately, the contact portion of the wheel can be dimensioned to measure individual thread diameters or thread artifacts as desired.

In addition, the Dimension Measurement Subsystem preferably comprises logic/processing circuits and/or components configured to process data, such as by accumulating, encoder pulses representative of the rotation of the contact wheel. For example, and not limitation, such circuitry and components may comprise one or more counters, buffers, memory locations and/or software. In a preferred embodiment, when the Position Detection Subsystem transmits a signal indicating the relative position of the rotating component and therefore, of the part to be measured (e.g., pipe), the Dimension Measurement Subsystem reads and resets the accumulated encoder counts and writes the accumulated count to a buffer, memory location, or communication component. The Dimension Measurement Subsystem circuits and components preferably continuously accumulate the number of encoder pulses, such as by incrementing, until the next signal from the Position Detection Subsystem is received at which time the number of accumulated encoder pulses are again written to a buffer, memory location, or communication component and the counter reset to zero counts.

In general, it is preferred, but not required that the counter, buffer or memory location that increments the encoder pulse count have a capacity greater than at least the number of pulses that can be generated during one revolution of the contact wheel. For example, if the rotational encoder can generated 50,000 pulses per revolution, it is desired that the counter, buffer or memory location that stores the pulse count have a capacity greater than 50,000 counts or can store data representing a count greater than 50,000. It is also preferred that the counter, buffer or memory location that increments encoder pulse counts have a capacity greater than the number of pulses for a revolution of the part, and most preferably greater than about 4 to about 10 revolutions of the part. The Dimension Measurement System also may comprise a removable memory, such as a memory card, on which pulse counts, revolution signals and other data may be written as a backup to the data transmission.

In general, it also is preferred that the contact wheel diameter (or radius) be smaller than the diameter (or radius) of the part to be measured. For example, in a preferred embodiment, the contact wheel is a precision component made from hardened steel and having a diameter of 3.75 inches. It is preferred that the part diameter always be greater than the contact wheel diameter. It will be appreciated that when the contact wheel diameter is less than the part diameter, the contact wheel will complete more than one revolution before the part completes one revolution. In other words, and for example only, the contact wheel may complete 4.2 revolutions between position signals generated by the Position Detection Subsystem (indicating one revolution of the part). Thus, it may be beneficial to configure the counter, buffer or memory location that increments the encoder pulse count to have capacity greater than a multiple of the encoder pulses generated by one revolution of the contact wheel. In the example mentioned above, the counter, buffer or memory location may be configured to have a capacity greater than 500,000 counts or to store data representing a count greater than 500,000.

Depending on the specific implementation of the Dimension Measurement Subsystem, each time a part position signal is received by the Dimension Measurement Subsystem, the accumulated pulse count (e.g., 210,000 counts) may be transmitted to the Data Processing Subsystem. Alternately, the system can be configured to transmit counts only after a specified number of part revolutions have occurred. For example, if it is desired to determine part diameter from data generated from 5 part revolutions, the Dimension Measurement Subsystem may be configured to transmit to the Data Processing Subsystem a count representative of 5 revolutions of the part (e.g., 1,050,000 counts). In these particular embodiments, the Dimension Measurement Subsystem has limited data processing capabilities, and may or may not be configured to calculate or determine the actual part dimension, such as diameter. Rather the Data Processing Subsystem may be configured to receive information from the Dimension Measurement Subsystem (and the Position Detection Subsystem, if desired) and thereafter calculate or determine (and display) the actual part dimension, such as diameter. Alternately, embodiments of system may comprise Dimension Measurement Subsystems that have more is sophisticated data processing and visual display capabilities, such as the capability to calculate or determine the desired part dimension, and/or to display the measured part dimension. Still further, the Dimension Measurement Subsystem can be configured to send an alert signal if the part is rotating at a speed greater than a specified maximum, or slower than a specified minimum. The Dimension Measurement Subsystem also can be configured to detect count variations during a part measurement cycle, which indicate a surface speed change or ovality.

In general, the data collection process is repeated a preselected number of times, such as about 4 to about 10 part revolutions, until sufficient data has been collected to ensure an accurate measurement of the part. The data from the Dimension Measurement Subsystem may be transmitted to the Data Processing Subsystem by radio frequency, such as Bluetooth communication protocol, other wireless or radio frequency data protocol, or by hard wire.

In addition to or in place of a contact wheel rotation encoder, as described above, the Dimension Measurement Subsystem (or gage head) may also comprise an inclinometer, a radial displacement transducer, a surface roughness transducer and/or an axial displacement transducer. It will be appreciated that the terms "radial" and "axial" are relative to the part (e.g., pipe). An inclinometer can be used to measure angles, such as flank or thread angle; a radial displacement transducer, such as an LVDT, can be used to determine properties such as ovality and thread height; an axial displacement transducer can be used to determine properties such as thread pitch or length; and a surface roughness transducer can be configured to measure the surface roughness of the manufactured part. As discussed with respect to diameter, the Dimension Measurement Subsystem may be configured to accumulate the data (whether digital or analog) from these transducers and transmit the data to the Data Processing Subsystem, preferably after one or more revolutions of the part, as indicated by the Position Detection Subsystem. Alternately, the Dimension Measurement Subsystem may accumulate data from the transducers, manipulate or transform the data, and then transmit data to the Data Processing Subsystem.

The Data Processing Subsystem, which may be a dedicated central processing unit (CPU) is with display, a smartphone, a tablet or the like, is configured to process information and data from the Dimension Measurement Subsystem (and Position Detection System, as desired) and display the measured, calculated or determined dimensional parameter, such as diameter, based on received and inputted data. For example, and without limitation, if the system is programmed to require 4 part revolutions per measurement, and the Dimension Measurement Subsystem records about 200,000 contact wheel encoder pulses for each part revolution, the average encoder pulses per part revolution (e.g., 200,000) may be used along with the known diameter of the contact wheel to calculate the diameter of the pipe using known relationships between circumference and diameter. Similar calculations or determinations may be made for other dimensional properties from data from other transducers. For example, a diameter measurement may be made at one part location, then the Dimension Measurement Subsystem relocated a known distance (e.g., 1 inch) to another location and diameter measurements taken at that location. In addition to diameters of the part, the taper of the part between the measurement locations can be determined. Still further, run out of the part can be calculated from data from one or more revolutions of the part.

The communication link between the Dimension Measurement Subsystem and the Data Processing Subsystem may be wired or wireless, and may utilize a digital or other communication protocol because consistent latency is not as important, if at all, as compared to the Position Detection Subsystem to Dimension Measurement Subsystem link. Moreover, it is desired that substantive data be transmitted to the Data Processing Subsystem, whereas the information transmitted to the Dimension Measurement Subsystem by the Position Detection Subsystems preferably need only be the occurrence of an event, and not necessarily substantive data.

The Data Processing Subsystem may comprise error correction algorithms and other algorithms such as direction of rotation algorithms. The Data Processing Subsystem may also allow the operator to enter information about the setup that can affect the measured or calculated dimension or property. This information may include the contact wheel diameter, the part temperature, transducer temperature (e.g., wheel temperature), part material, and taper of the part, is for example.

It will be appreciated that a Position Detection Subsystem and a Dimension Measurement Subsystem can be deployed on a plurality of manufacturing machines in a facility, so long as the wireless communication link between the subsystems on an individual machine do not interfere with the communication links on adjacent machines. Each machine (e.g., each Dimension Measurement Subsystem on a machine) may communicate, such as by Bluetooth protocol, with a primary Data Processing Subsystem for the facility and/or with secondary data processing subsystems or display subsystems associated with each machine, including smart phones and tablets.

Figure 1:
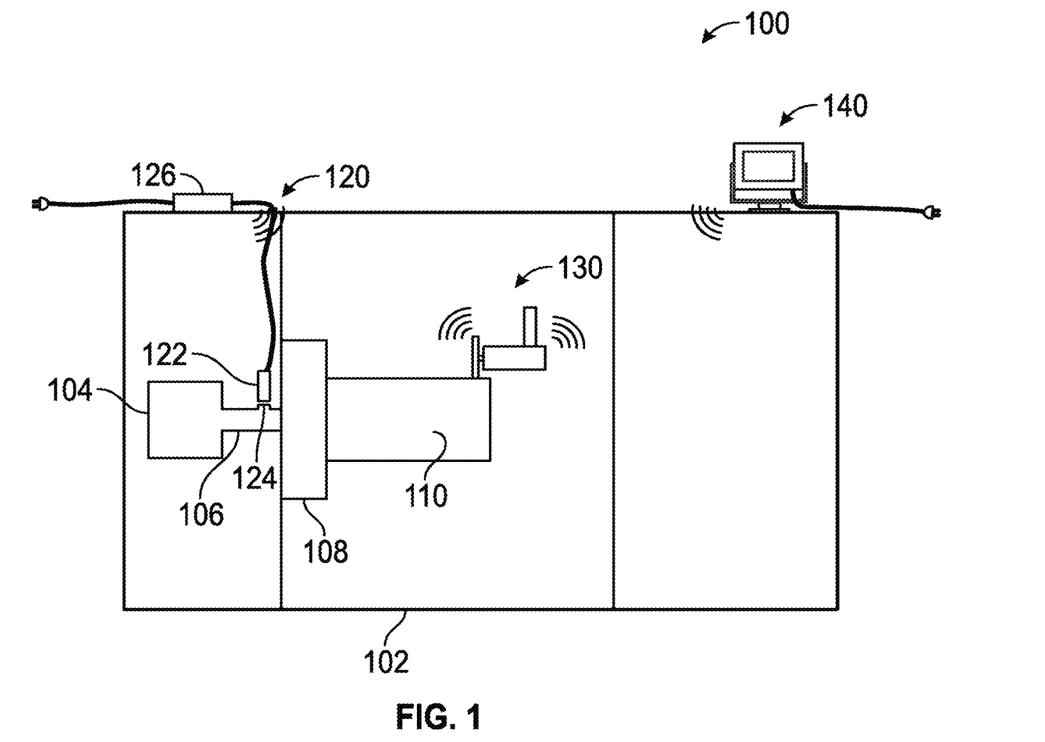
FIG. 1 illustrates a conceptual overview of one of many possible embodiments of an In-Process Diameter Measurement Gage.

Turning now to the Figures, which illustrate one or more non-limiting embodiments of the disclosed inventions, FIG. 1 illustrates an overview of an In-Process Diameter Measurement Gage 100 utilizing aspects of inventions discussed above. Illustrated in FIG. 1 is a machine 102, such as a lathe, comprising a motor 104, a shaft 106 and a chuck 108. Part 110, such as a threaded pipe or other component, is illustrated secured to the chuck, as is typical during machining operations. The system 100 is illustrated to comprise a Position Detection Subsystem 120, a Dimension Measurement Subsystem 130, and a Data Processing Subsystem 140.

As described above, the Position Detection Subsystem comprises an optical sensor 122 and an optical sensor trigger 124. The trigger 124, such as a reflector, is affixed to a component of the machine 102, such as shaft 106, that is representative of the rotation of part 110. The sensor 122 is mounted in operational alignment with the trigger 124 to detect when the trigger passes by the optical sensor 122, as an indication of a complete revolution of the part. The sensor 122 is illustrated to be wired to a control unit 126, which may receive hard wired power or be battery powered. The control unit 126 receives information from the sensor 122, such as a voltage pulse or spike when the trigger 124 passes the sensor 122, and manipulates that information, as required, for transmission to the Dimension Measurement Subsystem 130.

The control unit 126 comprises a transmitter configured to wirelessly transmit a single, predetermined digital word to the Dimension Measurement Subsystem, the receipt of which indicates that the part 110 has completed one revolution. In this embodiment, the digital word transmitted by the control unit 126 has no meaning other than the sensor 122 has detected a triggering event. Although not shown, control unit 126, also may communicate with the Data Processing Unit 140, either wired or wirelessly, to communicate parameters of operation, such as rotational speed of the part (RPM), or battery life, or power status.

As described above, and referring also to FIG. 2, the Dimension Measurement Subsystem 130 comprises a contact wheel 202, which is preferably a hardened steel wheel having a precision ground diameter between about 2 inches and about 6 inches, and most preferably about 3.75 inches. The wheel 202 is coupled, preferably removably coupled, to an encoding transducer 204 configured to generate a signals indicative of rotation of the wheel. For example, as described above, the encoder 204 may generate about 50,000 signals (e.g., pulses) for each complete revolution of the wheel 202. In other words, for a wheel 202 having a diameter of 3.75 inches, each encoder 204 pulse represents about 0.00024 inches of circumferential travel by the wheel 202. The wheel 202 and the encoder 204 are supported by a body 206, which is in turn supported by a shank 208. The shank 208 may be configured to be mounted in a standard tool block, so that it can rotate and contact the part to be measured. The body 206 comprises a radial translation assembly 210 configured to allow the wheel 202 and encoder 204 to displace radially toward and away from the part (shown in FIG. 1). It is preferred that the radial translation assembly 210 includes a biasing element, such as a spring, that causes the wheel 202 to displace toward the part 110. The biasing element may be configured to apply a force between the wheel 202 and the part 110 to ensure accurate tracking of the wheel 202 on the part 110. It is preferred that the applied force be in a range of about 5 lbf to about 10 lbf, and most preferably about 8 lbf±1 lbf. In a preferred implementation, the body includes at least one visual indicator, such as a green LED, that illuminates when the correct tracking force is applied to the part 110.

Figure 2:
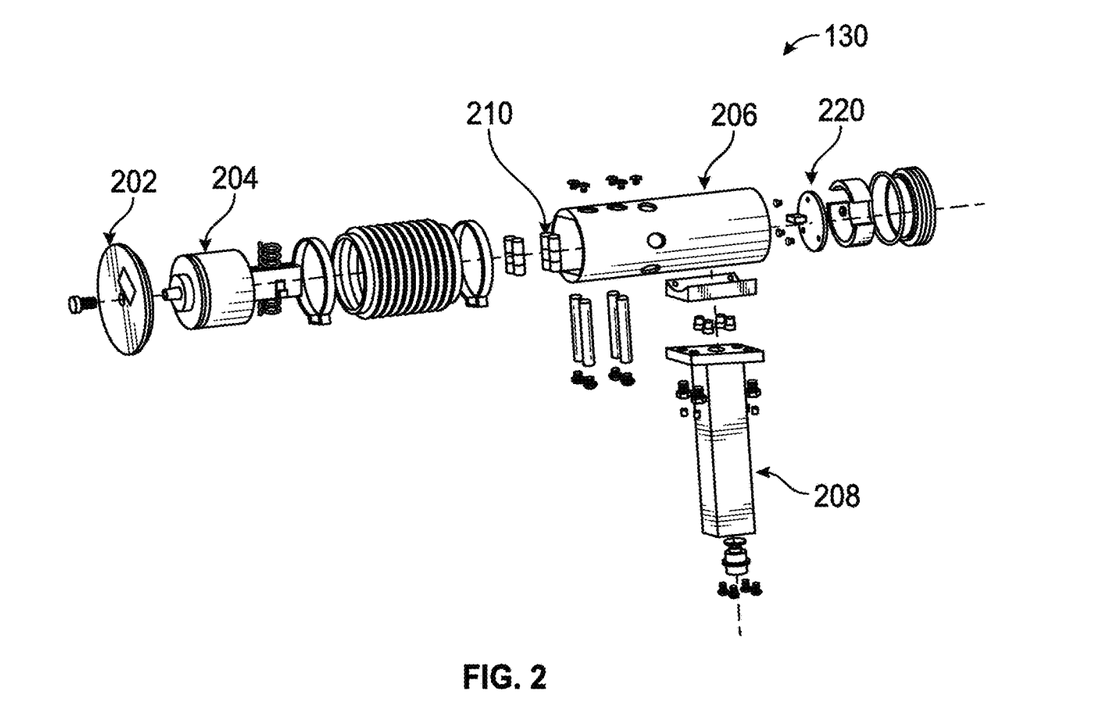
FIG. 2 illustrates an embodiment of a Dimension Measurement Subsystem suitable for use with the present invention.

As discussed above, the Dimension Measurement Subsystem 130 also comprises is electronic circuits on one or more circuit boards 220 providing an encoder data management component, and at least a wired or wireless receiver component for receiving transmissions from the Position Detection Subsystem 120, and a wired or wireless communication component for transmitting information to the Data Processing Subsystem 140.

As disclosed above, the Data Processing Subsystem 140, may comprise a dedicated processing unit with data input functionality and visual display, a laptop or desktop computer, a computer table or smart phone. In some implementations, the Data Processing Subsystem 140 will comprise a dedicated processing unit that is mounted to or adjacent the machine 102. In other implementations, the Data Processing Subsystem 140 will comprise a computer at a location remote from the machine 102. It is preferred that the Data Processing System 140 be configured to receive data from at least the Dimension Measurement Subsystem 130 and to calculate or determine the dimensional measurement of the part, such as diameter. The Data Processing Subsystem may also be configured to receive data from the Position Detection Subsystem for purposes of dimensional calculation or determination, or for purposes of system operational characteristics or both.

Figure 3:
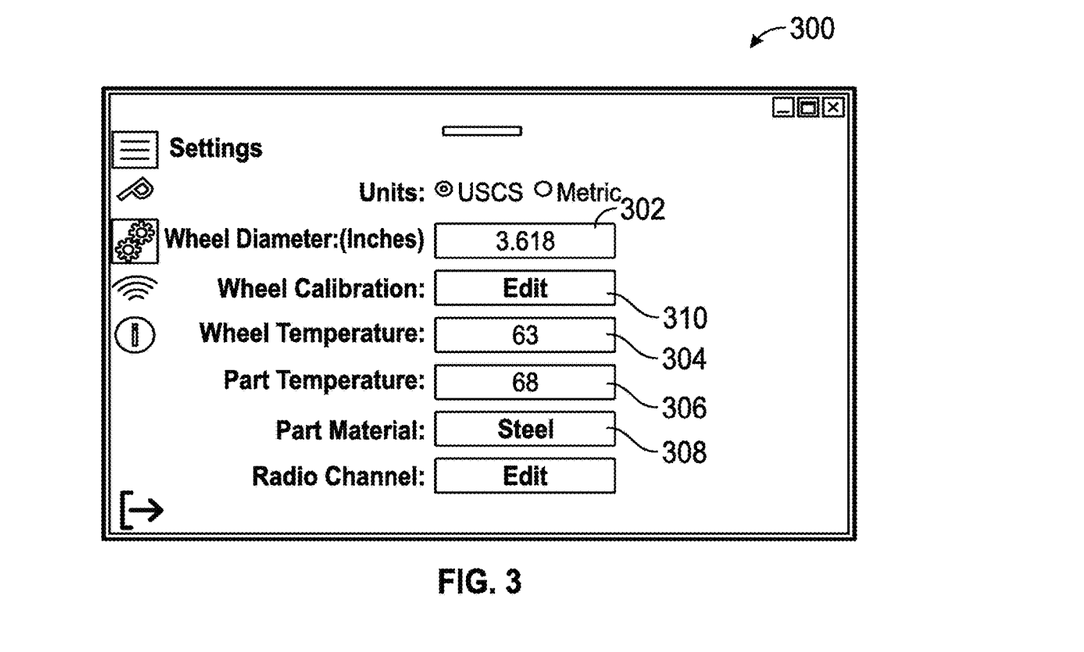
FIG. 3 illustrates one of many "Settings" screens from an embodiment of a Data Processing Subsystem suitable for use with the present invention.

FIG. 3 illustrates one of many possible "Settings" screens 300 on a Data Processing Subsystem 140 suitable for use with the present inventions. The Data Processing Subsystem 140 screen 300 may display a field 302 for inputting the known diameter of the contact wheel 202, such as 3.75 inches. Additionally, a measured temperature of the contact wheel and a measured temperature of the part 102 may be manually entered or automatically uploaded into fields 304 and 306. The material of the part, such as cast steel, cold rolled steel, stainless steel, other steel, malleable iron, aluminum alloys, monel alloys, Inconel alloys, pure titanium, 6A14V titanium, or others may be inputted into field 308. If desired or required, screen 300 can allow the operator to select a discrete channel for wireless communication between the Data Processing Subsystem 140 and the Dimension Measurement Subsystem 130.

The Data Processing Subsystem 140 also may provide a contact wheel 202 calibration or compensation capability as illustrated by field 310. For example, a certified master part (not shown) of known diameter (e.g., 8.02211 inches) may be chucked into the machine 102, and the In-Process Diameter Gage 100 set up as disclosed herein. Thereafter, the system 100 may be used to measure the diameter of the certified master part. If the measured diameter of the certified master part is different than the known diameter of the certified master part (i.e., 8.02211 inches), the measured diameter can be used along with the known diameter to calculate an effective or calibrated or compensated diameter of the contact wheel 202 using an equation similar to the following:

$$\text{WheelDiameter}_{CORRECTED} = \text{MasterDiameter}_{SPECIFIED} \times [\text{Wheel Diameter}_{SPECIFIED}/\text{Measured Result}].$$

As shown in FIG. 3, the calibration routine on the Data Processing Subsystem has calculated the effective diameter of the supposed 3.75 inches diameter wheel to be 3.618 inches, as shown in field 302.

The Data Processing Subsystem 140 also may provide a measurement error correction based on the temperatures of the part 110 and wheel 202 and the differences between the modulus of elasticities of the contact wheel 202 and the part 110. For example, if the contact wheel 202 is hardened steel and is biased against the part 110 with a force of between about 5 lbf and about 10 lbf, there may be elastic deformation of the part 110 at the contact point of the wheel 202 sufficient to affect the accuracy of the measurements. The Data Processing Subsystem 140 can be configured to compute an error correction or measurement compensation based on the differences in material properties, temperature, and biasing force.

Figure 4:
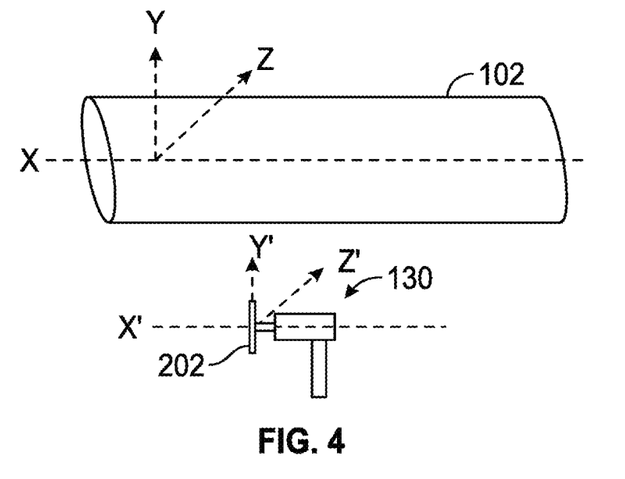
FIG. 4 illustrates an embodiment of the present invention during a measurement cycle.

FIG. 4 illustrates the preferred alignment between the part 102 and the Dimension Measurement Subsystem 130 to ensure accurate dimensional measurements. When the part 110 is coupled to the rotating machinery, such as chucked to a lathe, the chuck 104 and the part 110 will define an axial axis "X" and two orthogonal axes "Y" and "Z". It is preferred that the plane is or face of the contact wheel 202 be parallel to the Y and Z axes within about 0.005 inch across the face of the contact wheel 202.

Figure 5:
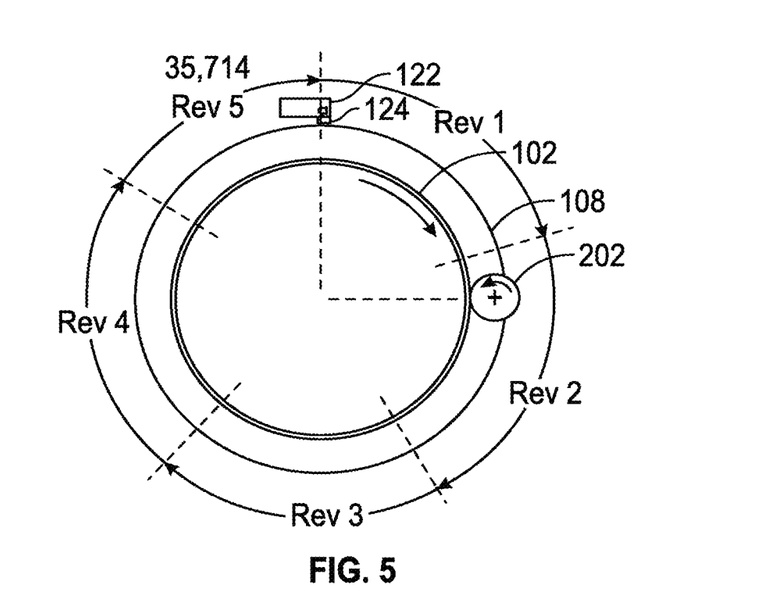
FIG. 5 illustrates the desired alignment between the contact wheel and the part.

FIG. 5 illustrates the In-Process Diameter Gage 100 in use measuring the diameter of a part 102. The Position Detection Subsystem 120 comprising optical switch 122 and trigger 124 are shown relative to the chuck 108, and in position to cause a signal indicative of full revolution of the part 102. The Dimension Measurement Subsystem 130 comprising contact wheel 202 is shown in biased contact with the outer surface of part 110. As the part 110 rotates in a clockwise direction, the wheel 202 rotates in a counterclockwise direction, as illustrated. Because of the relative sizes of the wheel 202 and the part 110, the wheel 202 will complete multiple revolutions for each complete revolution of the part 110. As illustrated in FIG. 5, the wheel 202 will complete four revolutions and part of a fifth revolution before the optical switch is triggered indicating a complete revolution of the part 110. Assuming the Dimension Measurement Subsystem 130 encodes 50,000 counts per wheel 202 revolution, the Dimension Measurement Subsystem 130 will accumulate about 235,714 counts per part 110 revolution. During a measurement cycle, the first time the trigger 124 passes the optical switch 122, the Dimension Measurement System starts measuring the part by accumulating rotary encoder 204 counts. Each time the trigger passes the optical switch, a counter is incremented by 1 revolution until the present number of part revolutions has been achieved. Thereafter, the Data Processing Subsystem can display the determined measurement. As discussed above, this count data can be transmitted to the Data Processing Subsystem upon completion of each part revolution (e.g., after the optical switch 122 signal has been received) or after the completion of the set number of part revolutions have been completed (such as 5 part revolutions).

Other and further embodiments utilizing one or more aspects of the inventions described above can be devised without departing from the spirit of our invention. For example, the rotary encoder 204 may be replaced with other encoders or transducers, as discussed above, or other encoders or transducer may be included with the rotary encoder 204. As further example, a combined rotary encoder and axial displacement transducer may be used to measure thread is diameter and thread lead or pitch. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A measurement-system for determining a diameter of a rotating machined part, comprising,
    a position detection subsystem comprising a target associated with a rotating machined part and a detector remote from the target, the subsystem configured to detect and generate a signal that the rotating part has completed a revolution;
    a measurement subsystem comprising a measuring wheel of known diameter configured to contact a rotating machined part;
    a data processor having a communication component associated with the measurement subsystem and configured to wirelessly receive the signals from the position detection subsystem, and configured to encode incremental rotation of the measuring wheel when the measuring wheel rotates with the rotating machined part; and
    wherein the diameter of the rotating machined part where the measuring wheel contacts the rotating machined part is calculated from the known diameter of the measuring wheel and the amount of incremental rotation of the measuring wheel during at least one full revolution of the rotating machined part.

2. The measurement system of claim 1, wherein the signals from the position detection subsystem have consistent latency.

3. The measurement system of, claim 1 wherein the measurement subsystem comprises a rotation encoder configured to generate a plurality of signals for each revolution of the wheel.

4. The measurement system of claim 3, wherein the position detector subsystem comprises an optical switch with a field of view, and a trigger that rotates in time with the machined part into and out of the field of view once every revolution of the part.

5. The measurement system of claim 4, wherein the data generated by the measurement subsystem comprises a total number of signals for at least one revolution of the part.

6. The measurement system of claim 5, wherein the data generated by the measurement subsystem comprises a total number of signals for at least 4 to 10 revolutions of the part.

7. The measurement system of claim 1, wherein the data processing subsystem is configured to determine diameter run out of the part.

8. The measurement system of claim 5, wherein the part rotates at a speed of between about 50 SFM and about 400 SFM.

9. The measurement system of claim 2, wherein the dimensional property is taper.

10. The measurement system of claim 3, wherein the contact wheel is biased against the part with a force between about 7 lbf and about 9 lbf.

11. A method of measuring a dimension of a rotating part, comprising, providing a rotating part from which a diametrical measurement is required;
    generating a signal representative of a complete revolution of the rotating part;
    contacting a wheel of known diameter with a location on the rotating part to be measured;
    biasing the wheel against the rotating part with a predetermined force;
    generating a signal for each incremental revolution of the wheel, so that a plurality of signals are generated for each complete revolution of the wheel;
    transmitting the signal that is representative of a completed revolution of the rotating part to a processor;
    generating data representative of the number of plurality of signals generated by the wheel for at least one complete revolution of the rotating part;
    determining a diameter of the rotating part from the data and the diameter of the wheel; and
    displaying the diametrical measurement.

12. The method of claim 11, wherein transmitting the signal representative of part revolution to the measurement device is done with consistent latency.

13. The method of claim 11, wherein the measurement device comprises a contact wheel of known diameter and a rotation encoder configured to generate a plurality of signals for each revolution of the wheel.

14. The method of claim 13, wherein generating a signal representative of when the rotating part completes a revolution comprises an optical switch with a field of view, and a trigger that rotates in time with the part into and out of the field of view once every revolution of the part.

15. The method of claim 14, wherein the data representative of the number of plurality of signals generated by the wheel comprises a total number of signals for at least 4 to 10 revolutions of the part.

16. The method of claim 12, further comprising determining a diameter run out of the part.

17. The method of claim 12, wherein the part rotates at a speed of between about 50 SFM and about 400 SFM.

18. The method of claim 12, wherein the biasing force is between about 7 lbf and about 9 lbf.

19. The system of claim 1, wherein the target is not affixed to the rotating machined part but to a component rotating with the rotating machined part.

20. The method of claim 11, comprising moving the wheel out of contact with the rotating part once a measurement cycle has been completed, further machining the rotating part, and repeating another measurement cycle.

\* \* \* \* \*